US006972858B1

(12) United States Patent
Nishida et al.

(10) Patent No.: US 6,972,858 B1
(45) Date of Patent: Dec. 6, 2005

(54) IMAGE COMMUNICATION APPARATUS AND IMAGE COMMUNICATION METHOD

(75) Inventors: Yasuo Nishida, Yokohama (JP); Yoshihiro Ida, Iwatsuki (JP)

(73) Assignee: Panasonic Communication Co., Ltd., Fukuoka (JP)

( * ) Notice: Subject to any disclaimer, the term of this patent is extended or adjusted under 35 U.S.C. 154(b) by 0 days.

(21) Appl. No.: 09/285,700

(22) Filed: Apr. 5, 1999

(30) Foreign Application Priority Data

| Apr. 6, 1998 | (JP) | ................................. 10-092929 |
| Mar. 25, 1999 | (JP) | ................................. 11-081406 |

(51) Int. Cl.$^7$ ......................... H04N 1/00; G06F 15/173
(52) U.S. Cl. ..................... 358/1.15; 358/407; 358/435; 358/468; 379/100.01; 379/100.15; 709/239
(58) Field of Search ............................. 358/402, 403, 358/407, 434, 435, 438, 439, 440, 442, 444, 358/468, 1.15; 379/100.01, 100.08, 100.11, 379/100.12, 100.13, 100.15, 206, 238, 239

(56) References Cited

U.S. PATENT DOCUMENTS

| 5,095,445 | A | | 3/1992 | Sekiguchi |
| 5,125,025 | A | * | 6/1992 | Lim ...................... 379/100.14 |
| 5,142,622 | A | | 8/1992 | Owens |
| 5,200,993 | A | | 4/1993 | Wheeler et al. |
| 5,351,237 | A | | 9/1994 | Shinohara et al. |
| 5,384,835 | A | | 1/1995 | Wheeler et al. |
| 5,455,687 | A | * | 10/1995 | Fukui et al. ................ 358/438 |
| 5,517,324 | A | * | 5/1996 | Fite, Jr. et al. ............. 358/434 |
| 5,862,202 | A | * | 1/1999 | Bashoura et al. ...... 379/100.14 |
| 5,881,233 | A | | 3/1999 | Toyoda et al. |
| 5,974,449 | A | * | 10/1999 | Chang et al. ............... 709/206 |
| 6,005,677 | A | * | 12/1999 | Suzuki ....................... 358/442 |
| 6,009,153 | A | * | 12/1999 | Houghton et al. ..... 379/102.02 |
| 6,020,980 | A | * | 2/2000 | Freeman ..................... 358/402 |
| 6,020,981 | A | * | 2/2000 | Ogiyama .................... 358/434 |
| 6,021,186 | A | * | 2/2000 | Suzuki et al. .......... 379/100.12 |
| 6,028,679 | A | * | 2/2000 | Murphy ...................... 358/407 |
| 6,104,505 | A | * | 8/2000 | Malik .......................... 358/434 |
| 6,157,706 | A | * | 12/2000 | Rachelson ............. 379/100.08 |
| 6,192,045 | B1 | * | 2/2001 | Williams et al. ............ 370/352 |
| 6,374,291 | B1 | * | 4/2002 | Ishibashi et al. ............ 709/206 |

(Continued)

FOREIGN PATENT DOCUMENTS

EP            898410 A2      2/1999

(Continued)

OTHER PUBLICATIONS

English language abstract of JP 9-149189.

(Continued)

*Primary Examiner*—Joseph R. Pokrzywa
(74) *Attorney, Agent, or Firm*—Greenblum & Bernstein, P.L.C.

(57) ABSTRACT

A network controlling section makes communication with a receiver side, and receives receiver side information including the presence or absence of Internet facsimile capabilities on a receiver side, mail addresses, and an apparatus possession capability. A receiver side information identifying section identifies receiver side information. The receiver side information identifying section registers identified receiver side information to a receiver side information table. A determining section provides an instruction to an image conversion processing section and an IFAX processing section to transmit image data to be suitable for the capability on the receiver side with reference to the receiver side information table. When the receiver side has Internet facsimile capabilities, the IFAX processing section transmits image data as an E-mail over the Internet. Also, the image conversion processing section converts image data to be suitable for the possession capabilities on the receiver side.

15 Claims, 7 Drawing Sheets

U.S. PATENT DOCUMENTS

| | | | |
|---|---|---|---|
| 6,603,569 B1 * | 8/2003 | Johnson, Jr. et al. | 358/1.15 |
| 6,690,480 B2 * | 2/2004 | Maeda | 358/1.15 |
| 6,735,289 B1 * | 5/2004 | Shanmugham | 379/93.09 |

FOREIGN PATENT DOCUMENTS

| | | |
|---|---|---|
| JP | 6-217069 | 8/1994 |
| JP | 6-350788 | 12/1994 |
| JP | 7-288557 | 10/1995 |
| JP | 7-288634 | 10/1995 |
| JP | 9-149189 | 6/1997 |
| JP | 10334007 | 12/1998 |
| JP | 11-88645 | 3/1999 |
| JP | 11065963 | 3/1999 |
| JP | 11112772 | 4/1999 |
| JP | 11127330 | 5/1999 |
| JP | 11252301 | 9/1999 |
| JP | 11261628 | 9/1999 |
| WO | 98/28892 | 7/1998 |

OTHER PUBLICATIONS

RFC2305 "A Simple Mode Of Facsimile Using Internet Mail", which was published on Mar., 1998, by K. Toyoda.
English language abstract of JP 11-112772.
English language abstract of JP 11-88645.
English language abstract of JP 11-127330.
Patent Abstracts of Japan vol. 1996, No. 02, published on Feb. 29, 1996.
English Language Abstract of HEI 11-261628.
English Language Abstract of JP 11-252301.
English Language Abstract of JP 6-217069.
English Language Abstract of JP 6-350788.
English Language Abstract of JP 6-217069.
English Language Anstract of JP 6-350788.

* cited by examiner

TIFF FILE

| HEADER | 51 |
| IFD | 52 |
| IMAGE DATA (FIRST PAGE) | 53 |
| IFD | 52 |
| IMAGE DATA (SECOND PAGE) | 53 |
| ... | |
| IFD | 52 |
| IMAGE DATA (FINAL PAGE) | 53 |

FIG. 5

| FAX NUMBER | MAIL ADDRESS | LINER DENSITY | PAPER SIZE | CODING SYSTEM |
|---|---|---|---|---|
| 03-1234-5678 | ifax1@mgcs.co.jp | 200dpi | A4 | MH |
| 73-2234-0001 | | 400dpi | A4 | MR |
| 045-555-6666 | ifax2@aaa.bb.co.jp | 200dpi | B4 | JPEG |
| ⋮ | ⋮ | ⋮ | ⋮ | ⋮ |

FIG. 6

IMAGE COMMUNICATION APPARATUS AND IMAGE COMMUNICATION METHOD

BACKGROUND OF THE INVENTION

1. Field of the Invention

The present invention relates to an image communication apparatus and an image communication method. Specifically, the present invention relates to an internet facsimile apparatus and an image communication method using the Internet or Local Area Network.

2. Description of the Related Art

As a conventional facsimile apparatus, there are generally used G3 facsimile apparatuses, which perform data communication using an analog network, G4 facsimile apparatus, which performs data communication using a digital network such as ISDN. The facsimile apparatuses using such the analog network and the digital network (hereinafter referred to as "public switched telephone network (PSTN)" in a word) are hereinafter called G3/G4 FAX. On the other hand, The Internet facsimile apparatuses, which receive and transmit data over the Internet protocols (hereinafter referred to as IFAX), have recently been developed. Particularly, standardization of an e-mail type IFAX, which receives and transmits image data using e-mail transfer protocols, is proceeding in IETF (The Internet Engineering Task Force) and ITU (International Telecommunication Union).

IFAX comprises both an IFAX section for realizing the Internet and G3/G4 FAX sections for realizing G3 and G4 facsimile communications. As a result, if a case where a receiver side has an IFAX function, data is received and transmitted over the Internet, while in a case where the receiver side has no IFAX function, the public switched telephone network is used.

The following will explain a case in which SMTP (Simple Mail Transfer Protocol) and POP (Post Office Protocol) are used as a mail transfer protocol in data transmission by the e-mail type IFAX. IFAX transmits a mail to a SMTP server. The SMTP server transfers the mail to a POP3 server to which a receiver side belongs. The POP3 server stores the mail in a mail box in a receiving destination. The receiver side downloads the mail from the mail box in the POP3 server.

Since data communication is thus non-synchronously carried out, the capability of cannot be exchanged between IFAX and the communication terminal on the receiver side. For this reason, an automatic recognition of whether or not the communication terminal at the receiving destination possesses an IFAX function cannot be carried out. An operator of IFAX must check whether or not the receiver side possesses the IFAX function in advance.

Moreover, G3/G4 FAX obtains information of the capability from the receiver side in the facsimile communication protocol, and transmits image data in accordance with the highest capability which both possess. However, since the capability cannot be exchanged between IFAX and the communication terminal on the receiver side, it is required that image data should be transmitted in equally accordance with the lowest capability, which the receiver side seems to possess. Otherwise, it is needed that an operator should check the capability on the receiver side and set communication conditions of IFAX manually.

SUMMARY OF THE INVENTION

An object of the present invention is firstly to provide an image communication apparatus being capable of automatically recognize whether or not a receiver side has IFAX functions and to provide its method.

Secondary, an object of the present invention is to provide an image communication apparatus being capable of automatically obtaining a capability on the receiver side so as to transmit image data in accordance with the capability and to provide its method.

The above object can be achieved by an image communication apparatus comprising:
public switched telephone communication means for receiving and transmitting data on a public switched telephone network;
transmitting means for transmitting an image over the Internet;
identifying means for identifying receiver side information from data received by the public switched telephone communication means; and
communication path selecting means for selecting any one of the public switched telephone network and the Internet as a communication path through which the image is transmitted to the receiver side based on the identification result obtained by the identifying means.

The above object can be achieved by an image communication apparatus comprising:
public switched telephone communication means for receiving and transmitting data on a public switched telephone network;
receiving means for receiving an image over the Internet; and
receiver side information transmitting means for transmitting self-information to a transmitter side using the public switch telephone communication means.

The above object can be achieved by an image communication apparatus comprising:
receiving means for receiving data including a capability on a receiver side on a public switched telephone network;
identifying means for identifying the capability from data received; and
transmitting means for transmitting an image over the Internet to be suitable for the capability based on the identification result obtained by the identifying means.

The above object can be achieved by an image communication apparatus comprising:
transmitting means for transmitting data including a self-capability to a transmitter side on a public switched telephone network; and
receiving means for receiving an image from the transmitter side over the Internet.

The above object can be achieved by an image communication apparatus comprising:
receiving means for receiving data including a capability on a receiver side;
identifying means for identifying the capability on the receiver side from data received;
converting means for converting an image based on the identification result obtained by the identifying means; and
transmitting means for transmitting the image over the Internet.

The above object can be achieved by an image communication apparatus comprising:
transmitting means for transmitting data including a self-capability to a transmitter side; and
receiving means for receiving an image from the transmitter side over the Internet.

The above object can be achieved by an image communication apparatus comprising:
  communication means for carrying out a main communication for transmitting an image over the Internet after carrying out a sub-communication for receiving data including a capability on a receiver side;
  identifying means for identifying the capability on the receiver side from data received before the main communication after the sub-communication; and
  main communication controlling means for controlling the communication means such that the image is transmitted to be made suitable for the capability on the receiver side base on the identification result obtained by the identifying means.

The above object can be achieved by an image communication apparatus comprising:
  receiving means for receiving data including a mail address;
  identifying means for identifying the mail address on a receiver side from the received data; and
  transmitting means for transmitting an image to the identified mail address over the Internet.

The above object can be achieved by an image communication method comprising the steps of:
  receiving data from a receiver side on a public switched telephone network;
  identifying receiver side information from the data;
  selecting any one of the public switched telephone network and the Internet as a communication path through which an image is transmitted to the receiver side based on the identification result obtained by the identifying means.

The above object can be achieved by an image communication method comprising the steps of:
  receiving data including a capability on a receiver side on a public switched telephone network;
  identifying the capability on the receiver from data received; and
  transmitting an image over the Internet to be suitable for the capability on the receiver side based on the identification result obtained by the identifying step.

The above object can be achieved by an image communication method comprising the steps of:
  receiving data including a capability on a receiver side;
  identifying the capability on the receiver side from data received;
  converting an image based on an identification result obtained by the identifying step; and
  transmitting the converted image over the Internet.

The above object can be achieved by an image communication method comprising the steps of:
  performing sub-communication for receiving data including a capability on a receiver side;
  identifying the capability on the receiver side from data received in the sub-communication step; and
  performing main-communication for transmitting an image over the Internet to be suitable for the capability based on the identification result obtained the identifying step.

The above object can be achieved by an image communication method comprising the steps of:
  performing sub-communication for receiving data including a capability on a receiver side;
  identifying the capability on the receiver side from data received in the sub-communication step;
  storing an identification result obtained by the identifying step to storing means; and
  performing main-communication for transmitting an image over the Internet after the sub-communication.

The above object can be achieved by an image communication method comprising the steps of:
  receiving data including a mail address on a receiver side;
  identifying the mail address from the data; and
  transmitting an image to the mail address identified in the identifying step over the Internet.

The above object can be achieved by a storage medium having a program registered thereon, the program causing a computer, having public switched telephone communication means for receiving and transmitting data on a public switched telephone network and Internet transmitting means for transmitting data over the Internet, to execute procedures for;
  receiving data on the public switched telephone communication network by the public switched telephone communication means;
  identifying receiver side information from the data, processing for selecting any one of the public switched telephone network and the Internet as a communication path through which an image is transmitted to the receiver side based on an identification result; and
  transmitting the image through the selected communication path by the public switched telephone communication means or the Internet transmitting means.

The above object can be achieved by a storage medium having a program registered thereon, the program causing a computer, having public switched telephone communication means for receiving and transmitting data on a public switched telephone network and Internet transmitting means for transmitting data over the Internet, to execute procedures for;
  receiving data including a capability on a receiver side by the public switched telephone communication means;
  identifying the capability on the receiver side from received data; and
  transmitting an image over the Internet to be suitable for the capability on the receiver side based on the identification result by the Internet transmitting means.

The above object can be achieved by a storage medium having a program registered thereon, the program causing a computer, having receiving means for receiving data including a capability on a receiver side and transmitting means for transmitting data to the receiver side over the Internet, to execute procedures for;
  receiving data including the capability by the receiving means;
  identifying the capability from the data;
  converting an image based on the identification result; and
  transmitting the image to the receiver side over the Internet by the transmitting means.

The above object can be achieved by a storage medium having a program registered thereon, the program causing a computer, having communication means for making communications with a receiver side, to execute procedures for;
  performing main communication for transmitting an image over the Internet after performing a sub-communication for receiving data including a capability on the receiver side;
  identifying the capability on the receiver side from data received before the main communication after the sub-communication; and
  transmitting the image to the communication means to be suitable for the capability on the receiver side based on the identification result in the main communication.

The above object can be achieved by a storage medium having a program registered thereon, the program causing a computer, having communication means for making communications with a receiver side and storing means, to execute procedures for;

performing main communication for transmitting an image over the Internet after performing a sub-communication for receiving data including a capability on the receiver side;

identifying the capability on the receiver side from data received before the main communication after the sub-communication; and storing the identification result in the storing means.

The above object can be achieved by a storage medium having a program registered thereon, the program causing a computer, having receiving means for receiving data including a mail address on a receiver side and transmitting means for transmitting an image over the Internet, to execute procedures for;

receiving the data by the receiving means;

identifying the mail address from the data; and transmitting the image to the identified mail address over the Internet by the transmitting means.

BRIEF DESCRIPTION OF THE DRAWINGS

The above and other objects and features of the invention will appear more fully hereinafter from a consideration of the following description taken in connection with the accompanying drawing wherein one example is illustrated byway of example in which;

FIG. 5 is a view showing a format of a TIFF file;

FIG. 6 is a view showing one example of a receiver side information table in IFAX according to the embodiment of the present invention;

DETAILED DESCRIPTION OF THE PREFERRED EMBODIMENTS

An embodiment of the present invention will be more specifically explained with reference to the accompanying drawings.

Figure 1:
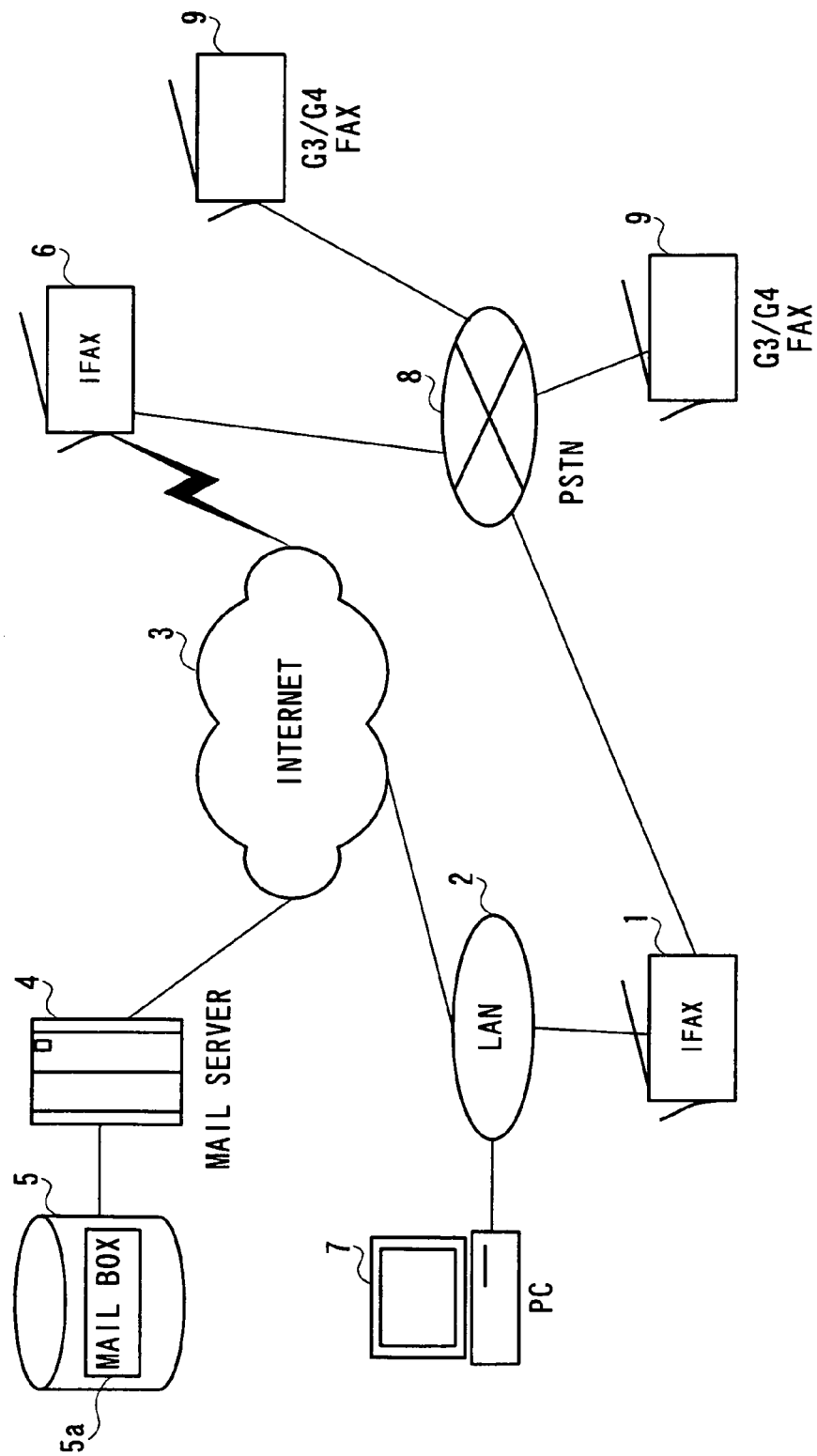
FIG. 1 is a conceptual view of a network according to an embodiment of the present invention.

Referring to FIG. 1, the network, which IFAX according to the embodiment operates, will be explained. FIG. 1 is a conceptual view of the network according to the embodiment. An e-mail transmitted from IFAX 1 is received a mail server 4 provided over the Internet 3 via a local area network (LAN) 2. The mail server 4 saves the e-mail in a mail box 5 provided in a secondary storing apparatus 5.

An IFAX 6 or a personal computer (PC) 7, serving as a receiver side terminal, makes an inquiry to the mail server 4. Then, if an incoming mail is presented in a self-mail box 5a, a receiving operation is carried out and the e-mail is received from the mail server 5.

The mail server 4 comprises, for example, a POP (Post Office Protocol) server.

The Internet facsimiles (IFAXes) 1 and 6 are connected to the Internet 3 through LAN 2 or by a dialup connection.

IFAXes 1 and 6 have a G3/G4FAX function. IFAXes 1 and 6 carry out facsimile communications between IFAXes and G3/G4FAXES 9 via a public switched telephone network (PSTN) 8.

Figure 2:
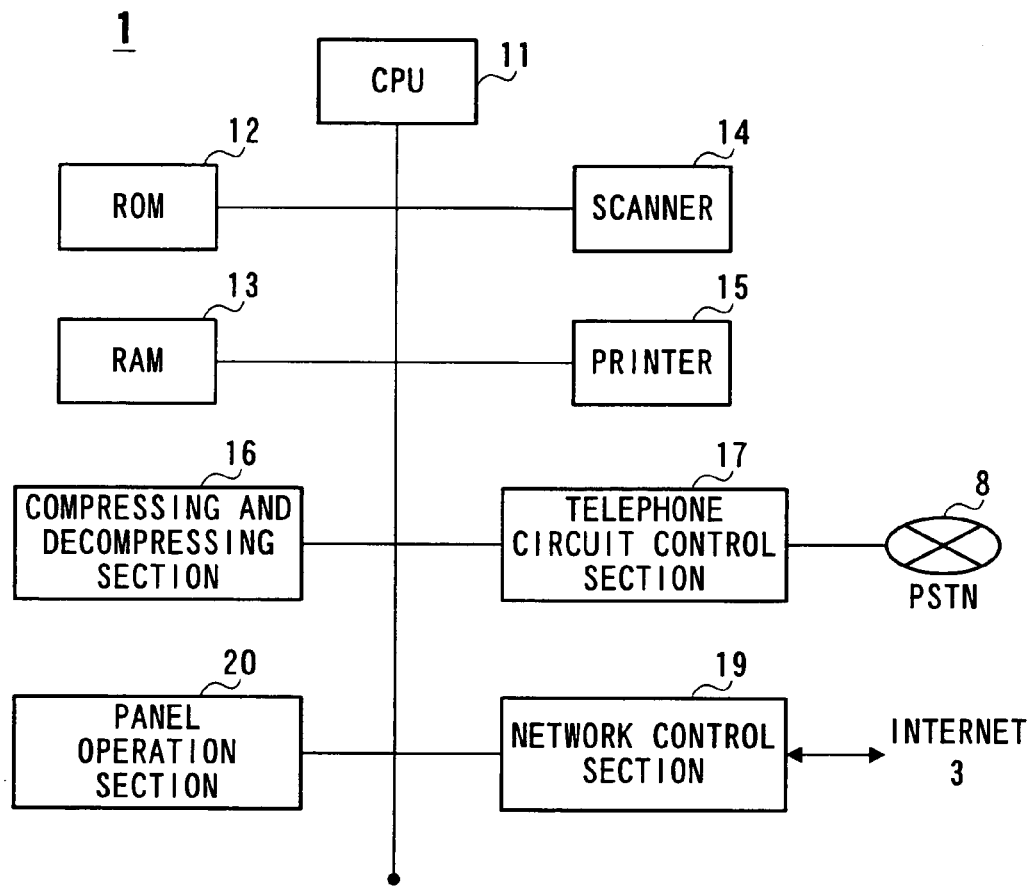
FIG. 2 is a block diagram showing the hardware configuration of IFAX according to the embodiment of the present invention.

FIG. 2 is a block diagram showing a software configuration of IFAX according to the aforementioned embodiment. A CPU 11 executes programs and controls the entirety of the apparatus. A ROM 12 stores the programs executed by CPU 11.

A RAM 13 is comprises a work area in which programs are executed and a storing area in which various data such as e-mail, image file, etc are temporarily stored.

A scanner 14 scans an original to obtain image data. The image data is stored in the storing area of RAM 13. A printer 15 prints out received image data.

A compressing and decompressing section 16 compresses raw image data scanned by the scanner into a compressed image film such as an MH file and decompresses the received image file. A telephone circuit control section 17 is an interface for receiving and transmitting data through facsimile communications and receiving and transmitting data on PSTN 8. The telephone circuit control section 17 comprises a CCU (communication control unit), a modem, an NCU (network control unit), etc.

A network control section 19 is an interface for executing protocols necessary for receiving and transmitting the e-mail on LAN 2 and the Internet 3.

A panel operation section 20 comprises dial keys and a touch panel. The panel operation section 20 receives operations done by the operator such as designation on the receiver side, transmission start instruction, etc. CPU 11 controls the respective sections based on an electric signal input from the panel operation section 20.

Figure 3:
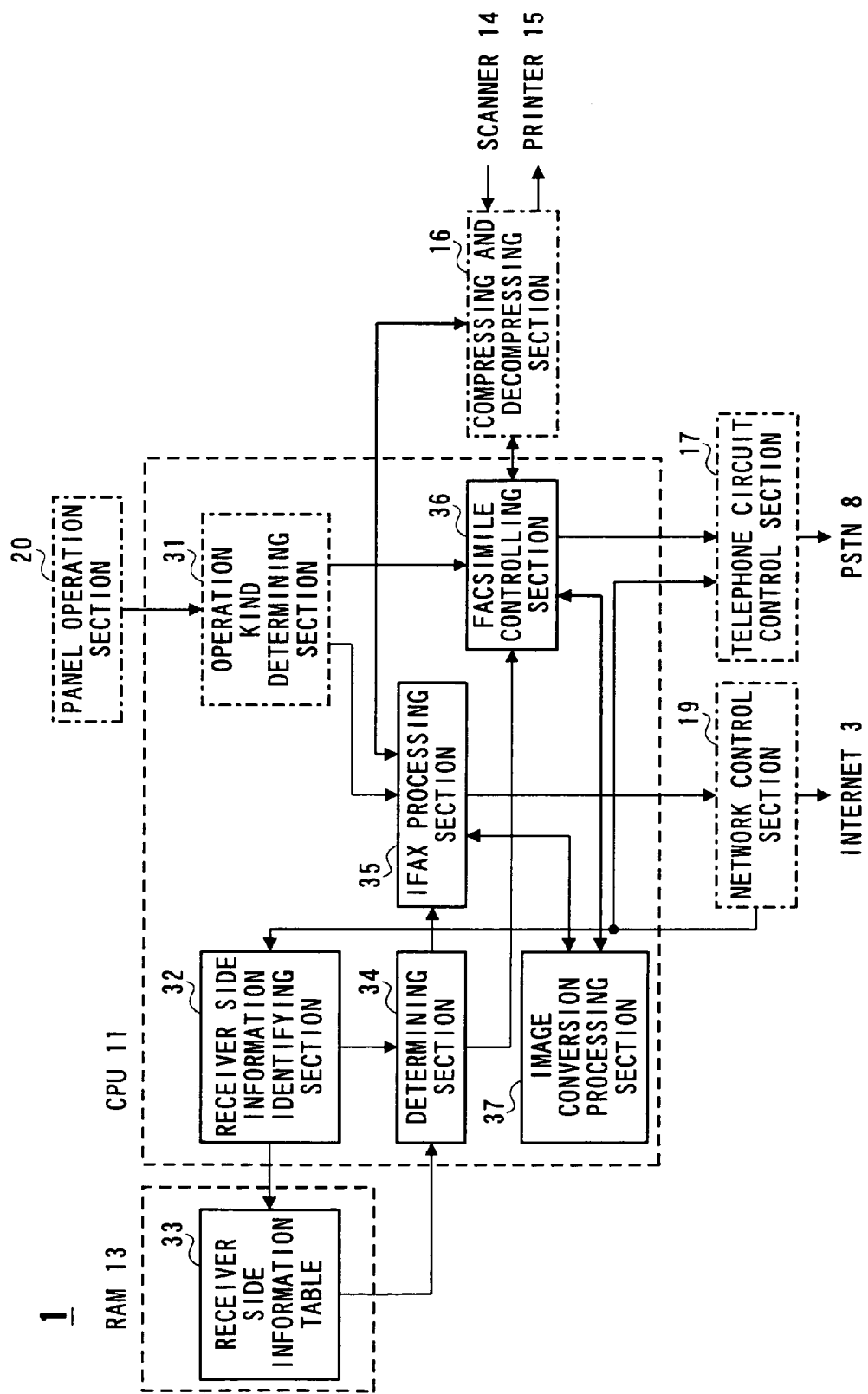
FIG. 3 is a block diagram showing the functions of IFAX according to the embodiment of the present invention.

FIG. 3 is a functional block for explaining IFAX functions according to the aforementioned embodiment.

An operation kind determining section 31 determines a kind of operations by an electric signal input from the operation panel 20. The operation kind determining section 31 provides an instruction to each section based on the determination result.

A receiver side information identifying section 32 identifies receiver side information received from the receiver side via the telephone circuit control section 17 and the network control section 18.

A receiver side information table 33 is provided in RAM 13. The table 33 is a storing area where the discrimination result obtained by the receiver side information identifying section 32 is made to correspond to the receiver side so as to be stored.

A determining section 34 determines which communication paths should be used and whether or not an image conversion are needed based on receiver side information on the receiver side stored by the receiver side information table 33.

An IFAX processing section 35 and a facsimile control section 36 transmit image data stored in RAM 13 by the respective communication systems in accordance with the instruction sent from the operation kind determining section 31 or the determining section 34. Also, the IFAX processing section 35 and the facsimile control section 36 receive image data on the other hand.

An image conversion processing section 37 carries out conversion of image data when the determination section 34 determines that image conversion is needed. This conversion of image data includes scaling, reduction in color, linear density conversion, a change in an image compression type, etc.

Figure 4:
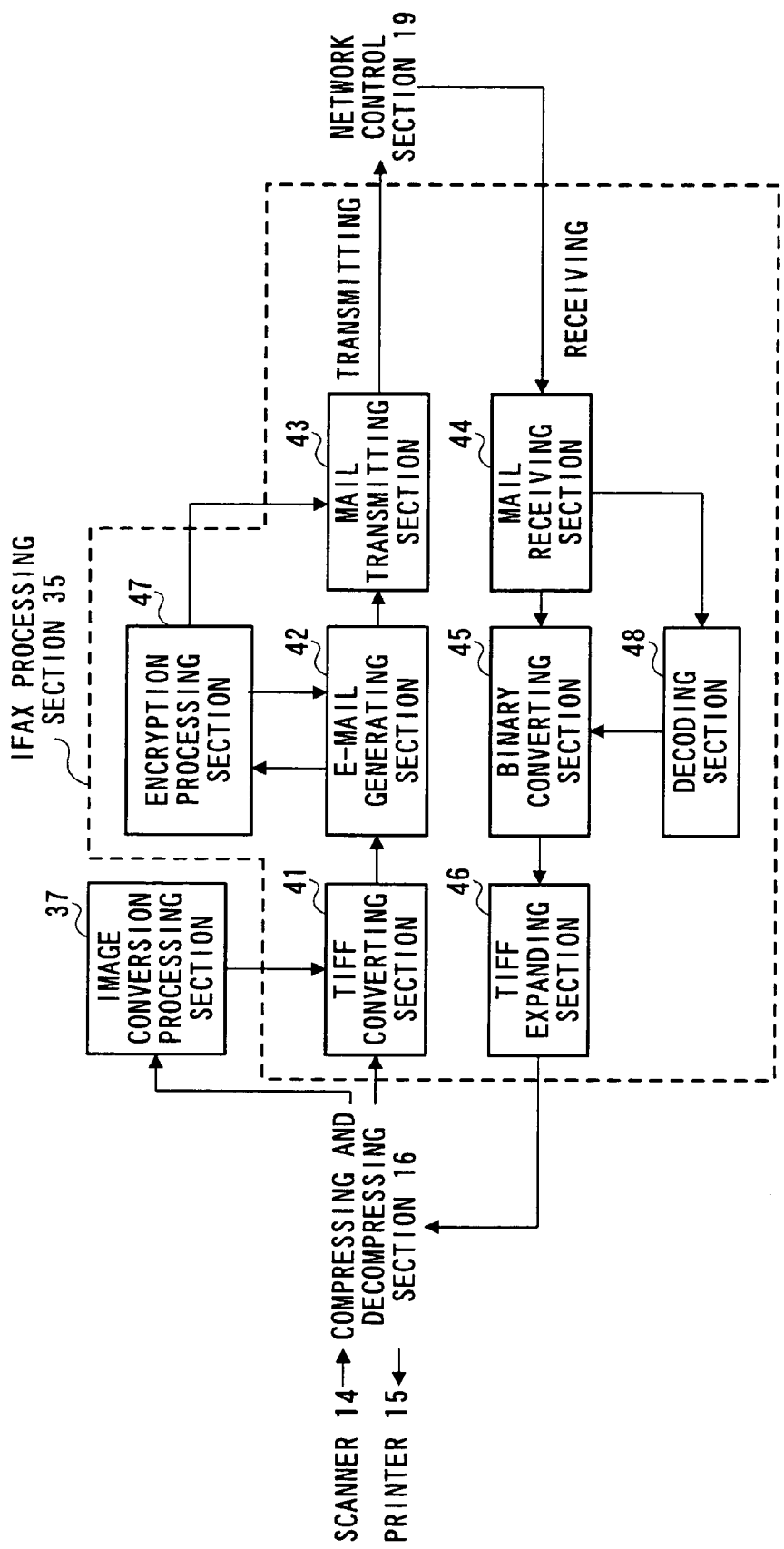
FIG. 4 is a block diagram showing the functions of an IFAX processing section in IFAX according to the embodiment of the present invention.

FIG. 4 is a block diagram showing the functions of the IFAX processing section 35. At a transmitting time, first of all, the raw image read by the scanner 14 is compressed to obtain compressed data by the compressing decompressing section 16. If need be, the raw image or the compressed data will be converted by the image conversion processing section 37. Next, compressed data is converted to a TIFF file by a TIFF converting section 41. Then, an e-mail generating section 42 generates an e-mail including TIFF file as an appended file. In other words, TIFF file is text coded, and stored in a data section of a complex structured mail such as MIME (Multipurpose Internet Mail Extensions) (IETF; RFC 2045, RFC 2046, RFC 2048, RFC 2049). Thereafter, a mail transmitting section 43 sends the e-mail to the mail server 4 via the network control section 19.

Also, an encryption processing section 47 encrypts e-mail data in accordance with the instruction sent from the operation panel 20 or the determining section 34. In the encryption, an encryption technique, which is employed in general e-mails such as S/MIME or PGP/MIME, etc., can be used.

On the other hand, at a receiving time, a mail receiving section 44 receives the e-mail from the mail server 4. When e-mail data is encrypted, a decoding section 48 decodes e-mail data. A binary converting section 45 binary converts an appended file portion of the received e-mail to a TIFF (Tagged Image File Format) file from the text file. Thereafter, a TIFF expanding section 46 expands the TIFF file. Next, the compressing and decompressing section 16 decompresses compressed data and sends decompressed data to the printer 15. The printer 15 prints out an image.

One original having a plurality of pages is stored in one TIFF file. Each page of the original is converted to one image compressed file. The TIFF file used in IFAX is described in the document RFC2301 "Format for Internet FAX" (Mclntyre, et al; March 1998). FIG. 5 shows the format of TIFF file. In the TIFF file, a header 51 appears at its top, and pairs of IFD (Image File Directory) 53 and image data 53 for one page, which correspond to the number of pages, appear after the header 51. The header 51 contains plurality of information. One of the information signifies what type of CPU registered this data. The other one signifies value of offset from the head of this data to the firs IFD. The method for showing a word differs, depending on the type of CPU. In IFD 52, a width of paper, the number of vertical lines, a compressing method, bit (MSB or LSB) positioned at the left of data, offset of data, the number of bytes of data are contained.

IFAX is intended to surely carry out communications with the minimum capability. As described in the document RFC2305 "A Simple Mode of Facsimile Using Internet mail" (K. Toyoda et. Al; March 1998), the minimum capability, which IFAX should possess, is specified as "simple mode."

More specifically, the communication protocol is SMTP, and transmitter side and receiver side support MIME and the minimum set of TIFF file.

The minimum set is defined in the above RFC 2301. In this document, five sets, S, F, J, L, M of TIFF file can be considered, depending on a facsimile mode and a profile which are supported by the IFAX. The lowest one is the minimum set.

More specifically, the minimum set specifies the following points:

A monochrome image is supported, the compression type is MH (Modified Huffman coding), CPU of Intel type is used, the width of paper is 1728 (corresponding to A4 size), resolution is 200 dpi, and data list is LSB.

The upper set than the minimum set supports a gray scale image, a color image, and the other compression types such as MR, MMR, JBIG, JPEG.

Moreover, although RFC2305 describes that encryption such as S/MIME and PGP/MIME can be used in the simple mode, this is not the indispensable function.

Next, the receiver side information identifying section 32 will be specifically explained. The receiver side information identifying section 32 communicates with the receiver side to exchange receiver side information. In this embodiment, facsimile communication on PSTN 8 is used to exchange receiver side information. IFAX on the receiver side transmits receiver side information to a facsimile information frame (FIF) included in a general facsimile protocol. The receiver side information identifying section 32 identifies receiver side information from facsimile information frame and stores the result in the receiver side information table 33.

Receiver side information includes information (hereinafter simply referred to as "IFAX function") having an IFAX function, an apparatus capability, and mail addresses. The apparatus capability includes the linear density, print paper size, and coding system of image compression, which are necessary for facsimile communication. In the coding system, HM, MR, and MMR, which are used in G3/G4FAX, and JPEG, JBIG, which are used in IFAX, are included.

The receiver side information table 33 will be specifically explained. As shown in FIG. 6, in the receiver side information table 33, the FAX numbers and the mail addresses are registered to specify the receiver side. Also, the apparatus capabilities are registered in accordance with these receiver side specifying information. Moreover, in the receiver side information table 33, a flag showing the IFAX function may set a flag.

Next, the determining section 34 will be specifically explained. At first, when there is no entry in an item of an e-mail address corresponding to the FAX number on the receiver side sent from the operation kind determining section 31, the determining section 34 determines that the receiver side has no IFAX function. In this case, the determining section 34 provides an instruction to a facsimile control section 36 to transmit image data over PSTN 8. While, when there is an e-mail address corresponding to the FAX number with reference to the receiver side information table 33, the determining section 34 determines that the receiver side has IFAX function. In this case, the determining section 34 provides an instruction to an IFAX processing section 35 to transmit image data over the Internet 3.

Secondly, the determining section 34 controls the IFAX processing section 35, the facsimile control section 36 and the image conversion processing section 37 with reference to the receiver side information table 33 in order to adapt image data to the apparatus capability on the receiver side. More specifically, in a case where the transmitter side supports high resolution but the receiver side supports only lower resolution, the determining section 34 causes the image conversion processing section 37 to carry out the linear density conversion for an image. Also, in a case where the transmitter side supports the print paper whose size is larger than that of the receiver side, the determining section 34 causes the image conversion processing section 37 to reduce the image. Thereafter, the IFAX processing section 26 converts image data, which has been subjected to the image conversion, to an e-mail so as to be transmitted over the Internet 3. In other words, when the transmitter side supports the upper set than the minimum set but the receiver side supports only the minimum set, the transmitter side reduces the image to the minimum set which is lower level than the set which the transmitter itself can support, and sends the reduced image.

Figure 7:
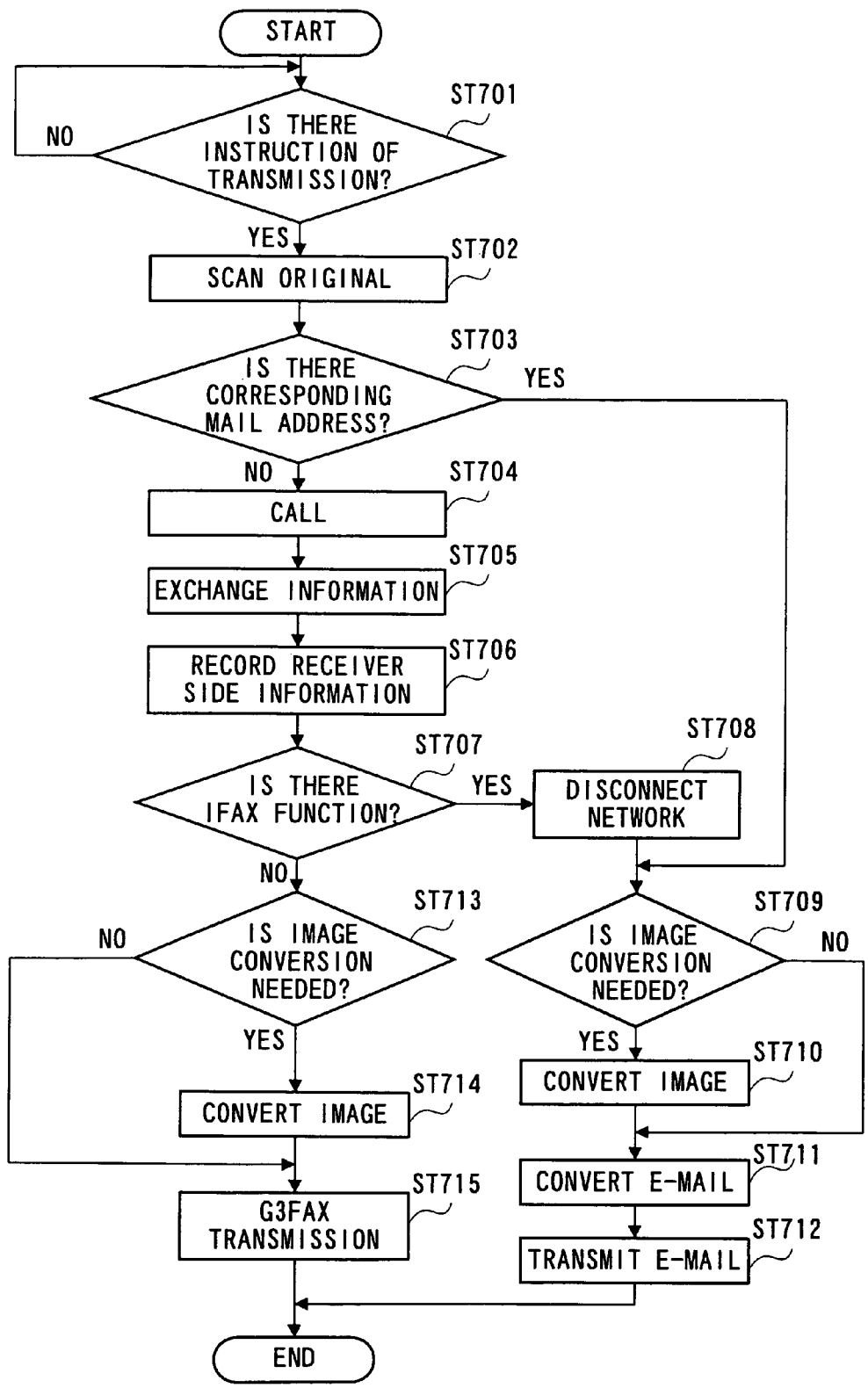
FIG. 7 is a flowchart showing each step of IFAX transmission operations in a transmitter side according to the embodiment of the present invention.
Figure 8:
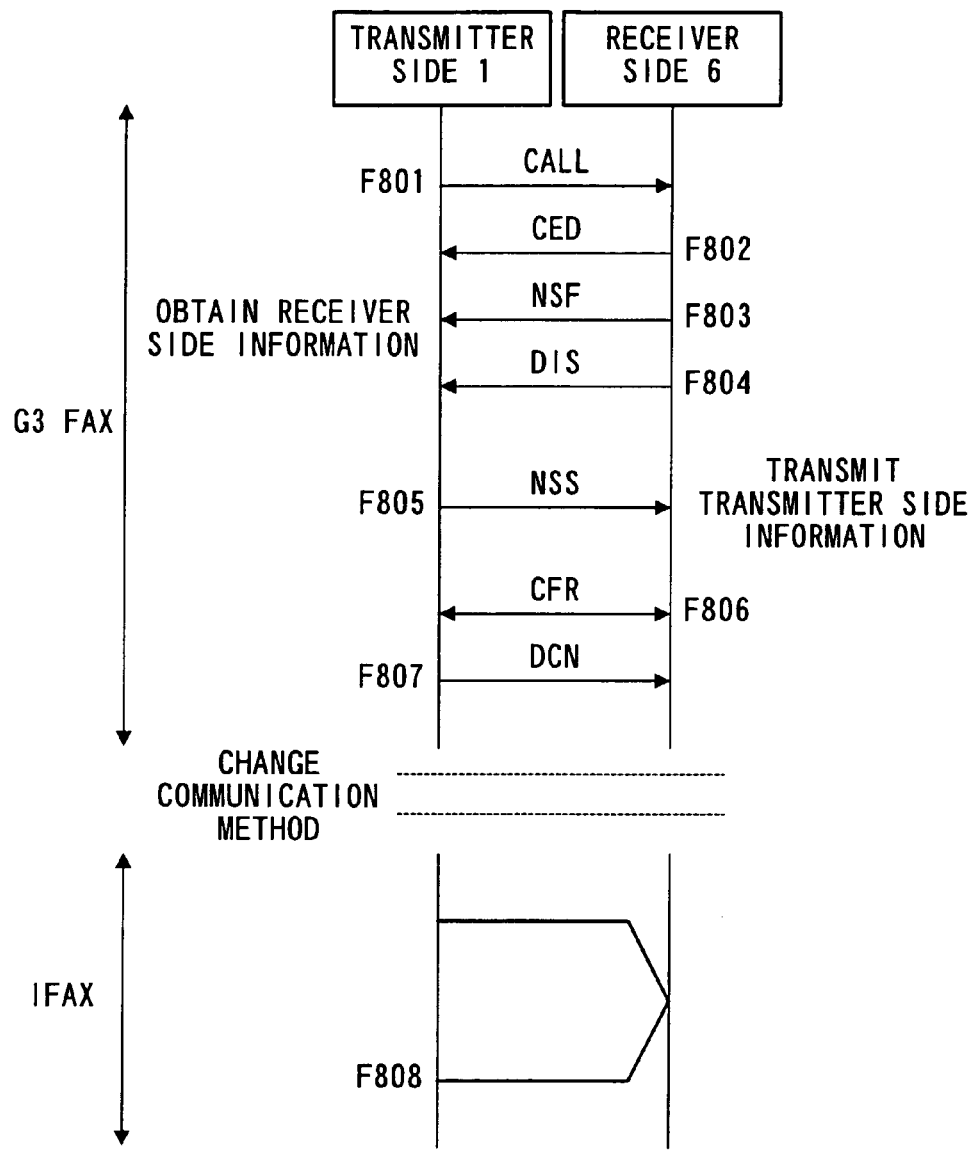
FIG. 8 is a sequence view showing a communication protocol between the transmitter side and the receiver side according to the embodiment of the present invention.

Next, the IFAX communication protocol according to the aforementioned embodiment will be explained. FIG. 7 is a flowchart showing the respective steps of the transmitting actions of IFAX on the transmitter side according to the aforementioned embodiment. FIG. 8 is a sequence view showing the communication protocol between the transmitter side and the receiver side.

Here, it is assumed that IFAX 1 is the transmitter side and that IFAX 6 on the receiver side has both the IFAX function and G3/G4FAX function similar to IFAX 1. Also, it is assumed that the transmitter side 1 has not yet recognized information of the receiver side 6. Moreover, it is assumed that the telephone circuit control section 17 carries out data receiving and transmitting using the communication protocol of G3 facsimile.

An operator inputs a FAX number on the receiver side from the panel operation section 20 and instructs transmission. When the instruction of transmission is detected in step (hereinafter referred to as ST) 701, the scanner 14 scans the original in ST702 and converts it to an electrical signal so as to obtain image data. The obtained image data is stored in RAM 13.

Next, in ST703, the determining section 34 checks whether or not there is an e-mail address corresponding to the FAX number input to the receiver side information table 33. In this example, since the transmitter side has not yet obtained information of the receiver side 6, the receiver 6 is unregistered in the receiver side information table 33 and there is naturally no mail address corresponding to the FAX number. Therefore, the determining section 34 outputs an instruction command for executing communications to the facsimile control section 5 in accordance with the communication protocol of G3 facsimile.

In ST704, the facsimile control section 36 controls the telephone circuit control section 17 in accordance with the instruction command and calls to the receiver side (F801 in FIG. 8).

Thereafter, in the receiver side 6, when the incoming call is detected, CDE (Called Station Identification) is transmitted to the transmitter side 1 from the receiver side 6 in case of an automatic incoming call (F802 in FIG. 8). Note that CED is an optional signal and is not always transmitted.

In ST705, the transmitter side 1 communicates with the receiver side 6 to exchange information. First of all, control signals each containing NSF (Non-Standard Facilities) and DIS (Digital Identification Signal) showing standard facilities (hereinafter referred to as "NSF signal" and "DIS signal", respectively) are transmitted from the receiver side to the transmitter side 1 (F803, F804 in FIG. 8).

Figure 9:
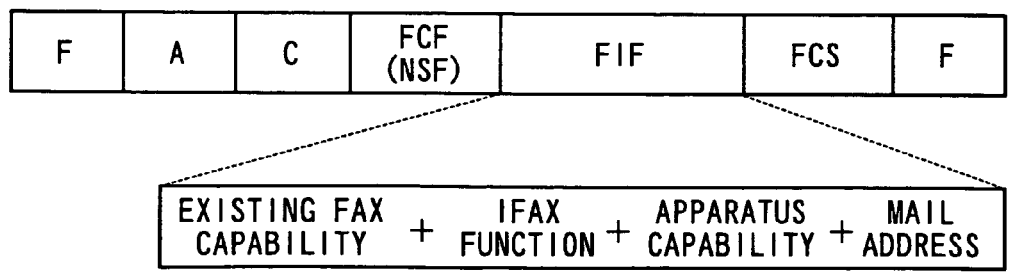
FIG. 9 is a frame structural view of an NSF signal transmitted from the receiver side according to the embodiment of the present invention.

FIG. 9 is a frame structural view of the NSF signal transmitted from the receiver side according to the above-mentioned embodiment. As shown in FIG. 9, the NFS signal comprises a flag sequence (F), an address field (A), a control field (C), a facsimile control field (FCF) using NSF, a facsimile information field (FIF), a frame check sequence (FCS), and a flag sequence (F).

In FIF, IFAX function, mail address, and apparatus capability are contained in addition to the existing facsimile functions as provided in ITU standard. The apparatus capability includes the linear density, print paper size, and the image coding system, which are necessary for facsimile communication.

Next, the receiver side information identifying section 32 identifies receiver side information from FIF of the NSF signal.

Thereafter, conversely, transmission side information is transmitted from the transmitter side 1 to the receiver side 1 (F805 in FIG. 8). For this reason, a control signal (hereinafter referred to as "NSS signal") containing NSS (Non-Standard Setup) which is a transmission command to NSF signal, is transmitted (F805 in FIG. 8). The frame structure of NSS signal is the same as that of NSF signal, and has the self-IFAX function, the self-mail address, and the self-apparatus capability in FIF.

When the NSS signal is normally received by the receiver side 6, a reception preparation confirmation signal CFR (Confirmation to Receive) is sent back to the transmitter side 1 (F806 in FIG. 8).

Note that message data can be retransmitted through the Internet facsimile communications when an error occurs in course of communication in F804 and the following shown in FIG. 8.

In ST706, the receiver side information identifying section 32 records identified receiver side information to the receiver side information table 33.

In ST707, the determining section 34 determines whether or not the receiver side 6 has the IFAX function. More specifically, the determining section 34 checks whether or not the mail address of the transmitter side 6 is registered with reference to the receiver side information table 33. Then, when there is the mail address, the determining section 34 determines that the receiver side 6 has the IFAX function, and when there is no mail address, the determining section 34 determines that the receiver side 6 has no IFAX function.

In this example, since the receiver side 6 has the IFAX function, the determining section 34 provides an instruction to the facsimile control section 36 to disconnect the network in ST708.

In ST709, the determining section 34 determines whether or not the image conversion is needed with reference to the receiver side information table 33. When the image conversion is needed, the image conversion processing section 37 carries out the conversion in accordance with the determination result by the determining section 34 in ST710. When the determining section 34 determines that no image conversion is needed in ST709, ST710 is skipped.

Next, in ST711, the IFAX processing section 35 converts image data to an electric mail as already explained. In ST712, the IFAX processing section 35 transmits the e-mail to the mail server 4 over the Internet 3.

On the other hand, when the receiver side is G3/G4 FAX 9 unregistered, the determining section 34 determines that the receiver side has no IFAX function in ST707. In this case, the determining section 34 transmits image data without disconnecting the network in accordance with G3 facsimile protocol. In other word, in ST713, it is determined whether or not the image conversion is needed. When the image conversion is needed, the image converting section 37 converts image data in accordance with the determination result in ST714. When it is determined that no image conversion is needed in ST713, ST714 is skipped.

Next, in ST715, the facsimile control section 36 transmits image data to G3/G4FAX 9 in accordance with G3 facsimile protocol.

The above explained the case in which the transmitter side was not registered in the transmitter side information table 33. Next, the case in which the transmitter side is registered in the transmitter side information table 33 will be explained. When the transmitter side has the IFAX function, there is the mail address, corresponding to the FAX number on the transmitter side, in the transmitter side information table 33 in ST703. For this reason, the operation goes to ST709, and image data is transmitted over the Internet 3.

On the other hand, when the transmitter side has no IFAX function, the operation goes to ST704 and the following and image data is transmitted to the transmitter side on PSTN 8 in accordance with the G3 facsimile protocol.

As explained above, according to IFAX1 of the aforementioned embodiment, the facsimile control section 36 receives the signal including receiver side information from the receiver side. Then, the receiver side information identifying section 32 identifies the presence or absence of the IFAX function on the receiver side from the received signal. Sequentially, when the receiver has the IFAX function, the determining section 34 determines that image data is transmitted over the Internet 3. While, when the receiver has no IFAX function, the determining section 34 determines that image data is transmitted on PSTN 8. Therefore, the IFAX 1 can automatically select the suitable communication path without the operator checking the presence or absence of the IFAX function on the receiver side in advance. Moreover, the operator does not have to designate the communication path using the operation panel 20. As a result, necessary time of PSTN 8 whose communication charge is high can be restrained to only the pre-protocol for exchanging the presence or absence of the IFAX function, so that the communication charge can be reduced.

Also, the receiver side information identifying section 32 registers the result of identification in the receiver side information table 33. For this reason, at the next time and the following, there is no need of performing communications on PSTN 8 for identifying the presence or absence of the IFAX function, so that the communication charge can be further reduced.

Further, according to IFAX 1 of the aforementioned embodiment, the facsimile control section 36 receives a signal including receiver side information from the receiver side on PSTN 8. Then, the receiver side information identifying section 32 identifies the apparatus capability of the receiver side from the received signal. The determining section 34 provides an instruction to the IFAX processing section 35 to transmit the e-mail including image data suitable for the apparatus capability of the receiver side. Since this makes it possible to exchange the apparatus capability between the transmitter side and the receiver side, image data can be transmitted in accordance with the highest level which the receiver side supports as in the conventional case. Also, since the operator does not have to check the apparatus capability of the receiver side, the transmission operation becomes simple.

In conventional IFAX, in a case where the transmitter side does not recognize the apparatus capability on the receiver side, the transmission must be performed in accordance with the simple mode defined by the aforementioned RFC 2305 such that the receiver side normally receives image data. When the explanation is given in view of the TIFF file format, the transmitter side must carry out transmission equally with the minimum set, which is the lowest in TIFF file sets.

In contrast with the above, IFAX according to the aforementioned embodiment can transmit the TIFF file which is upper set than the minimum set, which the receiver side supports. Moreover, the operator does not have to carry out a special operation, and the transmission can be carried out without considering the apparatus capability on the receiver side. As a result, the receiver can receive image data of higher quality without generating errors.

Namely, in a case where the transmitter side and the receiver side support the upper capability than the simple mode in common with each other, the transmitter side transmits image data directly. In a case where the receiver side supports only the simple mode, the transmitter side transmits image data in a simple mode. More specifically, for example, the image is converted to comply with the simple mode. This eliminates the inconvenience in which image data must be transmitted in the simple mode even if the transmitter side has the upper self-capability than the simple mode.

Also, according to the IFAX as in the aforementioned embodiment, the receiver side information identifying section 32 registers the identification results in the receiver side information table 33. The determining section 34 provides an instruction to the IFAX processing section 35 to transmit the e-mail, which is suitable for the apparatus capability of the receiver side, to the receiver side with reference to the receiver side information table 33. This eliminates the necessity of exchanging the apparatus capability at the next transmission and the following, thereby making it possible to reduce the required time for communication.

In the aforementioned embodiment, the determining section 34 provides image conversion processing to image data to be suitable for the apparatus capability of the receiver side. Other than the above, it is possible to encrypt e-mail when the receiver side provides for encryption. Thus, the scope of the present invention includes every process adapting the communication of the image over the internet to the apparatus capability of the receiver side.

Also, according to the above-mentioned embodiment, when IFAX 1 has no apparatus capability of the receiver side, an operation for obtaining the apparatus capability is carried out. However, the present invention is not limited to this case, and the apparatus capability may be obtained from the receiver side every time, periodically, or at a designated time in order to deal with the update of the apparatus capability.

Moreover, according to IFAX1 as in the aforementioned embodiment, the facsimile control section 36 receives the signal including received side information from the receiver side on PSTN 8. Then, the receiver side information identifying section 32 identifies the mail address of the receiver side from the received signal. Thereafter, the receiver side information identifying section 32 registers the mail address to the receiver side information table 33. As a result, the operator on the transmitter side does not have to check the mail address on the transmitter side, the operator has only to know the FAX number. Also, since the mail address is registered in the receiver side information table 33, it is unnecessary to check the mail address at the next time and the following. Moreover, if the mail address on the receiver side is displayed on the display section (not shown) in the next communication and the following, the operator makes it easy to eliminate the necessity of checking the mail address on the receiver side.

In a case where the mail address is updated, the operator inputs the FAX number from the operation panel 20 and instructs the update of mail address even if the corresponding mail address is registered into the receiver side information table 33. This causes the actions in ST704 to ST706 shown in FIG. 8 to be executed so that the mail address may be obtained.

Also, after the end of communications, IFAX 1 can display the IFAX capabilities of the receiver side, mail address, and apparatus capability on the display section (not shown), and can carry out a journal output to the printer 15. Thereby, the operator can easily recognize whether or not the receiver side possesses the IFAX capabilities or what capability the receiver side possesses.

The present invention is not limited to the above-mentioned embodiment. For example, according to the aforementioned embodiment, receiver side information and transmitter side information are included in the NSF signal and NSS signal, respectively, in accordance with the present protocol. However, if the protocol is changed in the future, it is possible to include receiver side information and transmitter side information in the other signal so as to be transmitted.

The above-mentioned embodiment explained the case in which G3 facsimile communication was taken as an example. However, the same effect as that of the present invention can be obtained in the facsimile communication by the other protocol such as G4 facsimile communication, etc.

The above-mentioned embodiment explained the case in which the apparatus possession capabilities were obtained in the communications in accordance with the facsimile protocol. However, one aspect of the present invention is that the pre-communication for obtaining the apparatus capability from the receiver side is executed prior to the actual communication in which the transmission of image data is carried out over the Internet, whereby the actual communication suitable for the apparatus capability of the receiver side can be performed. Therefore, the use of the facsimile communication to the pre-communication is no more than one specific form of the present invention. The available communication systems are all included in the range of the present invention.

For example, the communication protocol other than the facsimile communication protocol using the public switched telephone network can be used in the pre-communication. Moreover, LAN or the Internet can be used in the pre-communication. In the Internet protocol, for example, an e-mail transfer protocol such as SMTP, POP, IMAP (Internet Message Access Protocol) and a file transfer protocol such as HTTP (Hypertext transfer protocol), FTP (File Transfer Protocol) are used, whereby receiver side information is obtained and transmitter side information can be transmitted.

In the aforementioned embodiment, receiver side information can be obtained by executing direct communication with the receiver side. However, receiver side information is stored in the other communication apparatus such as a WWW server, a mail server, and communication with such a communication apparatus is carried out, whereby receiver side information may be obtained.

It is needless to say that the other aspects can be included in the present invention.

Moreover, the above embodiment explained the example of the facsimile apparatus. However, the other image communication apparatuses can be included in the range of the present invention. For example, the present invention includes PC, which is connected to the LAN card or the modem, to be over the Internet. The scanner or the printer can be connected to the PC through an outer I/F. Also, the present invention includes a network scanner having a network communication interface, and a network copy machine. Further, the present invention includes an image complex apparatus having capabilities such as a scanner, a printer, a copy machine, a facsimile apparatus, etc.

Moreover, the present invention includes a FAX server. The FAX server transfers data transmitted from a client's PC or IFAX to G3/G4FAX and transfers facsimile data to the client's PC from G3/G4FAX.

Further, the present invention includes a gateway apparatus for carryout out a relay between G3/G4FAX and IFAX.

Furthermore, the present invention includes a computer-readable storing medium storing a program for executing the same processing as that of IFAX according to the present invention.

The present invention is not limited to the above described embodiments, and various variations and modifications may be possible without departing from the scope of the present invention.

This application is based on the Japanese Patent Applications No. HEI 10-92929 filed on Apr. 6, 1998, and No. HEI 11-81406 filed on Mar. 25, 1999, entire content of which is expressly incorporated by reference herein.

What is claimed is:

1. A communication apparatus comprising:
   a facsimile communicator that performs a facsimile communication with a facsimile destination via a telephone network;
   an electronic mail communicator that performs electronic mail communication with a destination terminal via a computer network;
   a detector that detects identification information included in a non-standard signal which is transmitted from the facsimile destination while said facsimile communicator performs a facsimile protocol transmission to the facsimile destination, the identification information indicating that a facsimile destination is capable of electronic mail communication; and
   a facsimile communication controller that disconnects the facsimile communication when said detector detects the identification information in the non-standard signal,
   wherein said electronic mail communicator starts to perform the electronic mail communication with the facsimile destination upon disconnection of the facsimile communication.

2. The communication apparatus according to claim 1, further comprising a memory that is configured to store the identification information associated with the facsimile destination.

3. The communication apparatus according to claim 1, the non-standard signal including capability information of the facsimile destination.

4. The communication apparatus according to claim 3, the capability information includes at least resolution, print paper size, and coding system.

5. The communication apparatus according to claim 1, wherein, when said detector detects the identification information, the electronic mail communicator performs electronic mail communication with the facsimile destination upon disconnection of the facsimile communication, and when the detector does not detect the identification information, the facsimile communicator performs facsimile communication with the facsimile destination.

6. A communication apparatus comprising:
- a facsimile communicator that performs a facsimile communication with a facsimile destination via a telephone network;
- an electronic mail communicator that performs electronic mail communication with a destination terminal via a computer network;
- an obtainer that obtains an electronic mail address of the facsimile destination, included in a non-standard signal which is transmitted from the facsimile destination while said facsimile communicator performs a facsimile protocol transmission to the facsimile destination, when the facsimile destination with which said facsimile communication section performs the facsimile communication, is capable of electronic mail communication; and
- a facsimile communication controller that disconnects the facsimile communication when the obtainer obtains the electronic mail address of the facsimile destination,
- wherein said electronic mail communicator performs an electronic mail communication with the facsimile destination upon disconnection of the facsimile communication in response to obtaining of the electronic mail address of the facsimile destination.

7. The communication apparatus according to claim 6, wherein, when said obtainer obtains the electronic mail address of the facsimile destination, the electronic mail communicator performs electronic mail communication with the facsimile destination upon disconnection of the facsimile communication, and when the obtainer does not obtain the electronic mail address of the facsimile destination, the facsimile communicator performs facsimile communication with the facsimile destination.

8. A communication apparatus comprising:
- a facsimile communicator that performs a facsimile communication with a facsimile sender via a telephone network;
- an electronic mail communicator that performs electronic mail communication with a communication terminal via a computer network; and
- an adder that adds identification information to a non-standard signal which said facsimile communicator transmits to the facsimile sender during a facsimile protocol communication, the identification information indicating that the communication apparatus is capable of electronic mail communication, detection of the identification information disconnecting a facsimile communication,
- wherein the electronic mail communicator performs the electronic mail communication with the facsimile sender upon disconnection of the facsimile communication.

9. The communication apparatus according to claim 8, wherein, when the identification information is detected, the facsimile communication is disconnected and the electronic mail communicator performs electronic mail communication with the facsimile sender, and when the identification information is not detected, the facsimile communicator performs facsimile communication with the facsimile sender.

10. A method for identifying a destination terminal, the method comprising:
- performing a facsimile communication with a destination terminal via a telephone network;
- detecting whether identification information is included in a non-standard signal which is transmitted from the destination terminal while a facsimile protocol transmission is performed with the destination terminal, the identification information indicating that the destination terminal is capable of an electronic mail communication;
- storing the identification information when the identification information is detected;
- disconnecting the facsimile communication when the detecting detects the identification information in the non-standard signal, and
- initiating an electronic mail communication with the destination terminal after the facsimile communication is disconnected.

11. The method according to claim 10, the non-standard signal including capability information of the destination terminal.

12. The method according to claim 11, the capability information includes at least resolution, print paper size, and coding system.

13. The method according to claim 10, wherein, when the detecting does not detect the identification information, transmission via a facsimile communication with the destination terminal is performed.

14. A method for transmitting an electronic mail communication function capability from a receiving terminal to a facsimile sender, the receiving terminal having an electronic mail communication section that performs electronic mail communication with a communication terminal via a computer network, the method comprising:
- performing a facsimile communication with the facsimile sender via a telephone network;
- adding identification information to a non-standard signal included in a facsimile protocol transmission while the facsimile communication is performed with the facsimile sender, the identification information indicating that the communication apparatus is capable of the electronic mail communication, detection of the identification information disconnecting the facsimile communication, and
- performing an electronic mail communication with the facsimile sender upon disconnection of the facsimile communication.

15. The method for transmitting according to claim 14, wherein upon detection of the identification information and disconnection of the facsimile communication, an electronic mail communication is performed with the receiving terminal and when the identification information is not detected, a facsimile communication with a facsimile sender is performed.

* * * * *